United States Patent [19]
Chen

[11] Patent Number: 5,945,800
[45] Date of Patent: Aug. 31, 1999

[54] APPARATUS AND METHOD FOR CONTROLLING A STEPPING MOTOR

[75] Inventor: Tsu-Hsing Chen, Hsinchu, Taiwan

[73] Assignee: Umax Data Systems, Inc., Hsinchu, Taiwan

[21] Appl. No.: 09/013,227

[22] Filed: Jan. 26, 1998

[51] Int. Cl.$^6$ ........................................................ H02P 8/00
[52] U.S. Cl. ............................................................. 318/696
[58] Field of Search ................................. 318/640, 525, 318/432, 433, 434, 696, 685, 810; 388/904, 900, 901; 310/49 R

[56] References Cited

U.S. PATENT DOCUMENTS

4,063,212  12/1977  Sublett ..................................... 340/3 F

*Primary Examiner*—William M. Shoop, Jr.
*Assistant Examiner*—Rita Leykin
*Attorney, Agent, or Firm*—Pennie & Edmonds LLP

[57] ABSTRACT

Method for controlling the rotating speed of an electromechanical device is disclosed herein, the aforementioned method including the following steps. The first step is to map a plurality sets of electrical-parameter means to different ranges of rotating speed of the electromechanical device to form a mapping table. The plurality sets of electrical-parameter means couples various resistance to the electromechanical device and eliminating the back EMF (Electro-Mechanical Force) in said electromechanical device. The second step is to connect a set of electrical-parameter means of said plurality sets of electrical-parameter means to a driving means. The driving means is used to provide the power that used in the operation of the electromechanical device, the set of electrical-parameter means is connected to the driving means according to the mapping table.

8 Claims, 6 Drawing Sheets

FIG.4

APPARATUS AND METHOD FOR CONTROLLING A STEPPING MOTOR

BACKGROUND OF THE INVENTION

1. Field of the Invention

The present invention relates to the control of a motor, especially relates to the control of a stepping motor used in an image scanner of global range of scanning speed.

2. Description of the Prior Art

Figure 1A:
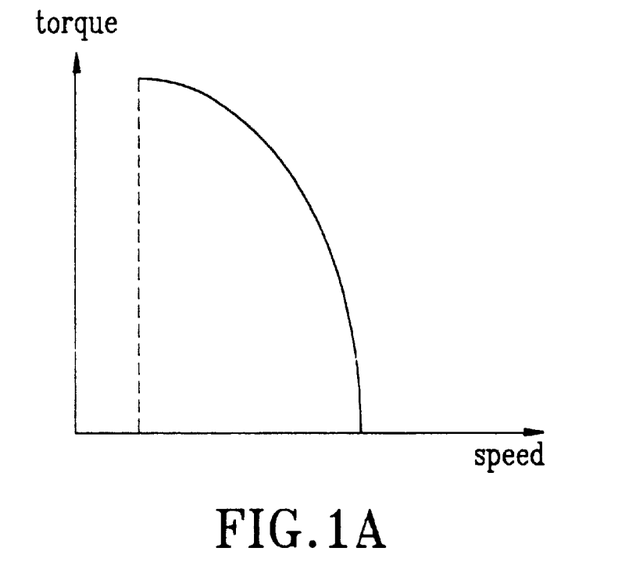
FIG. 1A is the speed-torque characteristic of a stepping motor.

In the application of an image scanner, the resolution is preferable to be related to the velocity of the movement of the scanning head. Because when the fixed scanning speed is utilized, the higher the resolution is, the more time the scanning head takes to transmit the acquired data. If the spec of the image scanner is 300×600 dpi (dot per inch), and the user can choose the resulted image data from 75 dpi to 600 dpi, the speed of the scanning head of the former is preferred to be 8 times that of the later. The relation between torque and speed of the stepping motor is approached in FIG. 1A. It is obvious that when the speed of the scanning head increases, the torque of the stepping motor decreases, so the speed of the scanning motor is available only in a limited range.

When the speed of the stepping motor is beyond the scope of the available range, the problems of the stepping motor such as insufficient torque, resonance and acoustic noise are produced. The insufficient torque and resonance of the stepping motor cause the smearing interruption, jitter and vibration of the output image of the image scanner. The acoustic noise makes the user uncomfortable. For the phenomenon mentioned above, some application speed of the stepping motor is unavailable, and the designer of the image scanner can not make use of the stepping motor operating in every range of the velocity of the scanning head.

Figure 1B:
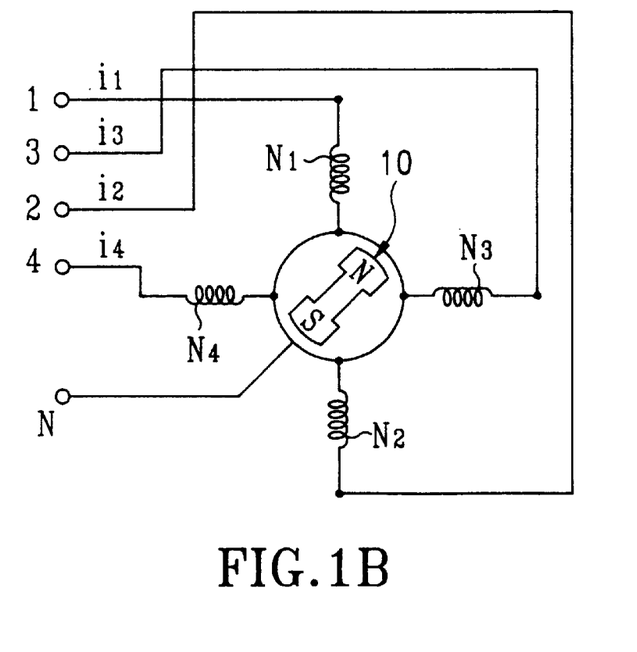
FIG. 1B illustrates the basic structure of a stepping motor.

Because the stepping motor controls the movement of the scanning head of the image scanner, the characteristic of the stepping motor is essential for the performance of the image scanner. Take a four-phase stepping motor for example. It is obvious that, in FIG. 1B, the change of the currents in four stator windings $N_1$, $N_2$, $N_3$ and $N_4$ controls the rotation of the rotor 10. The phase difference of the currents in the first and second stator windings $N_1$ and $N_2$ is 180 degree in radiance, and the phase difference of the currents in the third and fourth stator windings N3 and N4 is 180 degree in radiance too. The phase difference of the currents in the first and third stator windings $N_1$ and $N_3$ is 90 degree in radiance. The usual driving modes are unipolar, bipolar, 1 phase, 2 phase and 1–2 phase.

Figure 1C:
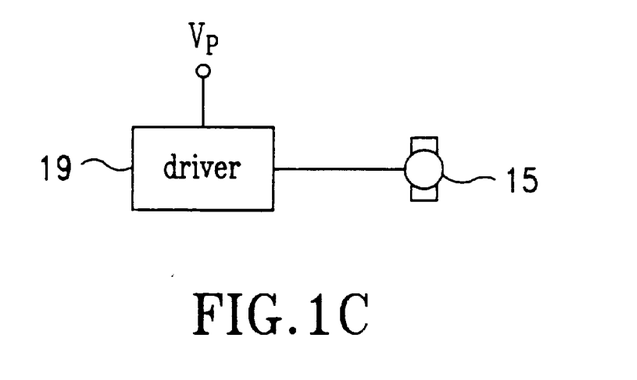
FIG. 1C illustrates the functional block diagram of a stepping motor of the image scanner according to the prior art.

The configuration of the stepping motor used in the image scanner and the driver of the stepping motor are shown as motor 15 and driver 19 in FIG. 1C. The driver 19 is used to provide the current that drives motor 15. The driver 19 is usually a set of bipolar transistor or a set of MOSFET (Metal Oxide Semiconductor Field Effect Transistor). Make use of the 1-phase-winding-model of a stepping motor, the circuit diagram of driver 19 and motor 15 can be expressed as that in FIG. 1D. The 1-phase-winding-model of motor 15 is shown as motor-model 100 in FIG. 1D and the driver 19 (unipolar driver) in FIG. 1C is shown as bipolar transistor 105 in FIG. 1D.

Figure 1D:
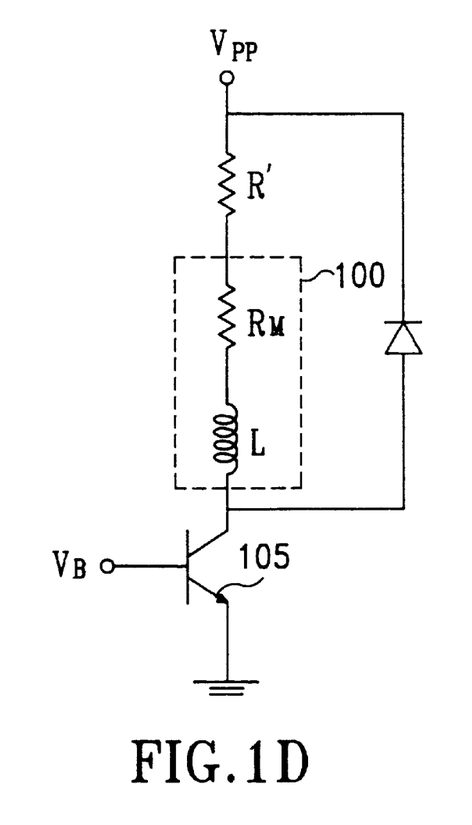
FIG. 1D illustrates the circuit diagram of the unipolar-driving-stepping-motor of the image scanner in the prior art.
Figure 1E:
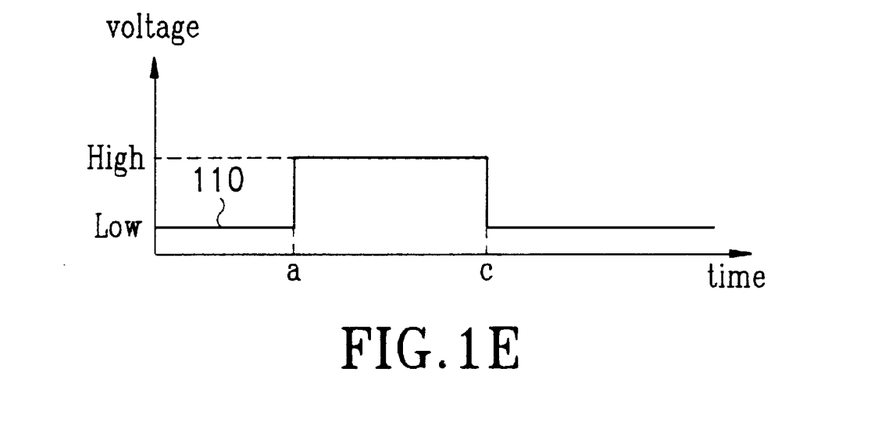
FIG. 1E is the waveform of the voltage applied to the driver of a stepping motor.
Figure 1F:
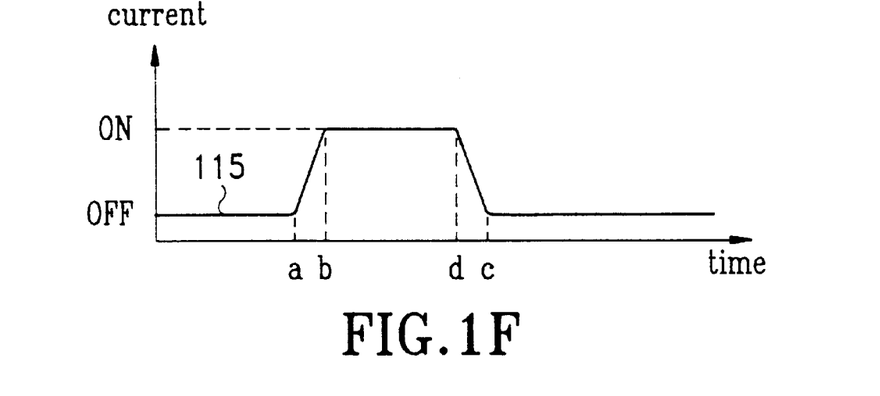
FIG. 1F is the waveform of the current induced in the stator winding of the stepping motor without the consideration of the back EMF (Electro-Mechanical Force)
Figure 1G:
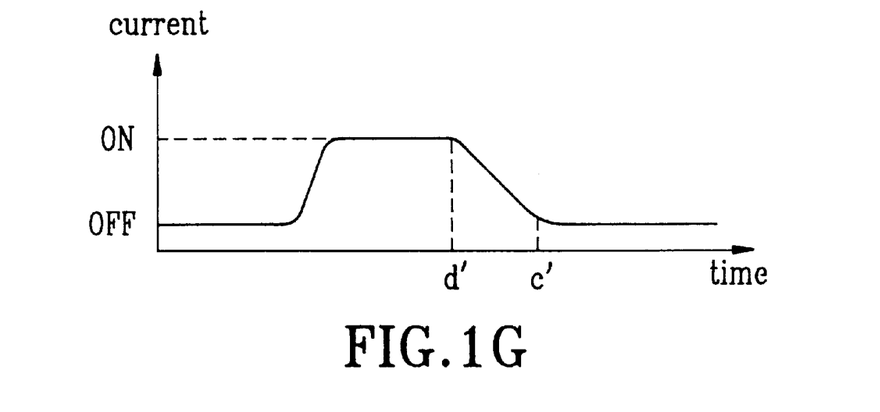
FIG. 1G illustrates the waveform of the current induced in the stator winding of the stepping motor with the back EMF taken into account.
Figure 1H:
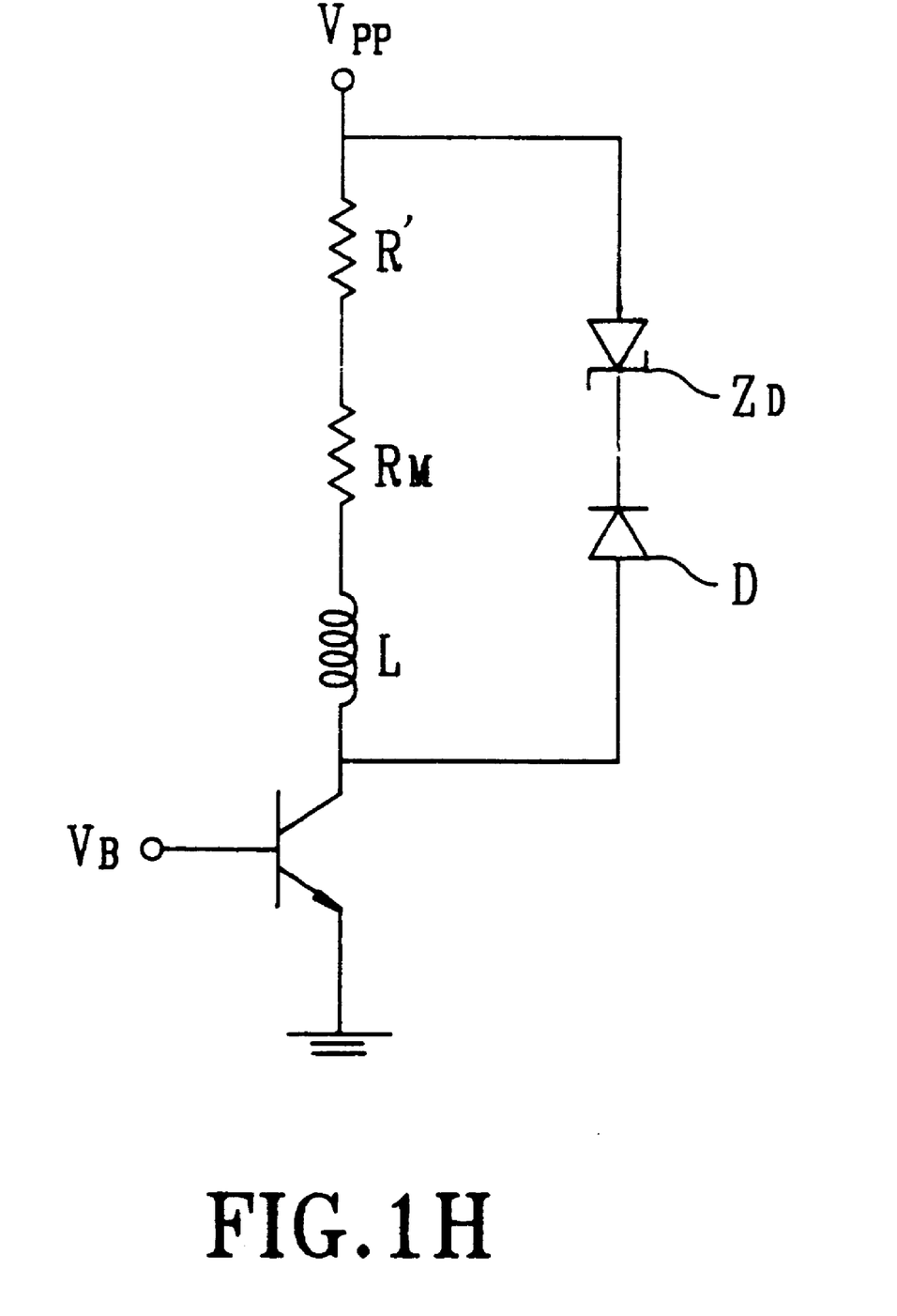
FIG. 1H shows the circuit diagram of the driver of the stepping-motor that with back EMF (Electro-Mechanical Force) compensated.

As shown in FIG. 1D, the motor-model 100 can be treated as an inductance L in series with a resistor $R_M$ The resistor R' is connected in series with the motor-model 100 to provide additional resistance for the control of time constant of stepping motor. Because the term R' in the time constant $[(L)/(R_M+R')]$ can be substituted by the designer of the stepping motor, the control of the time constant is thus carried out. Referring to FIG. 1D, when the voltage on terminal $V_B$ is the voltage waveform 110 (FIG. 1E), the exiting current on the stator winding is of the waveform 115 (FIG. 1F), which is without consideration of back EMF (Electro-Mechanical Force). Because the exiting current on the stator winding determines the position of the rotor 10, and the duration from point a to b and point c to d are both time constant of the stepping motor, assume the time constant to be τ, τ is essential to the stepping motor. When the back EMF is taken into consideration, the waveform of the exciting current in the stator winding is shown in FIG. 1G. It is clear that even when the driver is turned off, the current on the stator winding has not yet return to its minimum value. Thus the zero current recovery-time, i.e., the duration between point d and point c, is lengthened.

Though the resistor is connected to the stepping motor to avoid the shiver and acoustic noise, yet the current on the stator winding is reduced and the voltage-drop of the stepping motor is also reduced. For the reason mentioned above, the generated torque of the stepping motor become smaller due to the decrease of winding current, and the jitter and smearing interruption of the resulted image is produced. So the designer of the image scanner must make a trade off decision between time constant and torque of the stepping motor. Unless the stepping motor of excellent speed-torque characteristic is utilized, the global speed range of the scanning speed is impossible for the normal stepping motor under one fixed parameter.

Referring to FIG. 1 H, to decrease the back EMF, a Zener diode $Z_D$ is connected in series with the diode D. Thus the influence of back EMF is eliminated because the Zener diode $Z_D$ can provide shorter turn-off decay time. For all the aforementioned principles, the available speed range is confined to a scope because of the fixed parameter (resistor $R_M$ and Zener diode $Z_D$). If the designer of the image scanner wants to utilize the stepping motor that can operate in a wide range of rotating speed under one fixed parameter, i.e., the stepping motor of excellent dynamic characteristic, the cost will be very high, and the manufacturer rarely makes the aforementioned stepping motor.

SUMMARY OF THE INVENTION

Because it is preferable to make the scanning head of the image scanner move with various velocity according to the resolution of the resulted image, the speed of the stepping motor must be able to be changed in accordance with the velocity of the scanning head. In the prior art, the stepping motor with one fixed parameter, i.e. the fixed resistor and Zener diode, can work well with only a narrow range of speed.

To take over the problems mentioned above, the present invention makes use of the changing of a stepping motor to improve the speed-torque characteristic of the stepping motor. The present invention provides multiple parameters to provide every range of the stepping-motor a suitable parameter, thus the stepping-motor of high quality dynamic characteristic is acquired.

The method for controlling the rotating speed of a stepping motor is disclosed herein, the aforementioned method including the following steps. The first step is to map a plurality sets of electrical-parameter means to different ranges of rotating speed of the stepping motor to form a mapping table. The plurality sets of electrical-parameter means couples various resistance to the stepping motor and eliminating the back EMF (Electro-Mechanical Force) in said stepping motor. The second step is to connect a set of electrical-parameter means of said plurality sets of electrical-parameter means to a driving means. The driving means is used to provide the power that used in the operation of the stepping motor, the set of electrical-parameter means is connected to the driving means according to the mapping table.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Because the stepping motor that can operate in a wide range of speed is very expensive, and the designer always need the stepping motor that can operate in wide application speed range, the present invention provides a method and apparatus that has a plurality sets of parameters, such that the designer can select a set of parameter ($Z_D$, R) that is suitable for the speed of the scanning head. Because a specific range of speed of the stepping motor is available only under one specific parameter ($Z_D$, R), the present invention provides a plurality sets of parameters for the designer to use according to the need of the speed of the stepping motor. The designer choose a plurality sets of parameter according to the plurality of the scanning speed of the scanning head, and corresponds the circuit of the stepping motor to the application interface via a speed-parameter mapping table. When the user wants to use the image scanner, the user will choose a specified resolution of the scanned image on the application interface 51.

Every time when the user wants to scan in a specific resolution, the user chooses a resolution in the application interface and then start scanning. The scanning head is thus driven by the stepping motor and moves in a speed relating to the corresponding resolution. The relation between scanning speed and the corresponding resolution is determined by the designer. Furthermore, the designer arranges the relation of scanning speed and a corresponding set of parameter ($Z_D$, R).

Since the resolution is selected by the user, the computer 52 connected to the image scanner electrically couples the Zener diode as well as the resistor of the corresponding set of parameter and the stepping motor 50 via a speed-parameter mapping table 53 stored in a memory of the computer 52. Thus the stepping motor operates with the parameter that is suitable for the assigned scanning speed.

The designer designs the speed-parameter mapping table and makes the driver of the stepping motor connect to the corresponding parameter according to the speed-parameter mapping table. So the present invention can make the stepping motor having normal speed-torque characteristic operate perfectly in various ranges of speed. Even though the stepping motor of the worse dynamic (torque-speed) characteristic is utilized in the present invention, the plurality sets of parameters can make the stepping motor operates in various ranges of speed without image smearing interruption, jitter and vibration as well as the acoustic noise of the stepping motor.

The present invention provides multiple parameters for the designer of the image scanner, thus the designer relates specific ranges of speed of stepping motor to specific parameters ($Z_D$, R) by a program. From the user's point of view, the user selects a low resolution mode of the scanned image, the scanning head should be able to move faster than that of a high resolution mode. To satisfy the need of the user, the designer presents the image scanner that can scan with the speed related to the selected resolution of the acquired image.

The present invention provides a plurality of sets of parameters, i.e., Zener diode and resistors. The designer designs a program to connect the circuit of the stepping motor to one of the plurality of sets of the parameters. The connected set of the parameter is already selected according to the selected resolution in the program designed by the designer. Before the image scanner start scanning, the stepping motor is connected to the selected set of parameter by the program designed by the user in accordance with the speed-parameter mapping table. This is the reason that the stepping motor will operate according to the speed assigned by the designer. There are many apparati that can offer multiple parameters ($Z_D$, R) such as those shown in FIG. 2 and FIG. 3. Even only one of the parameters is adjusted, no matter only $Z_D$ or R is changed, the variation can be made without departing from the spirit of the present invention.

Figure 2:
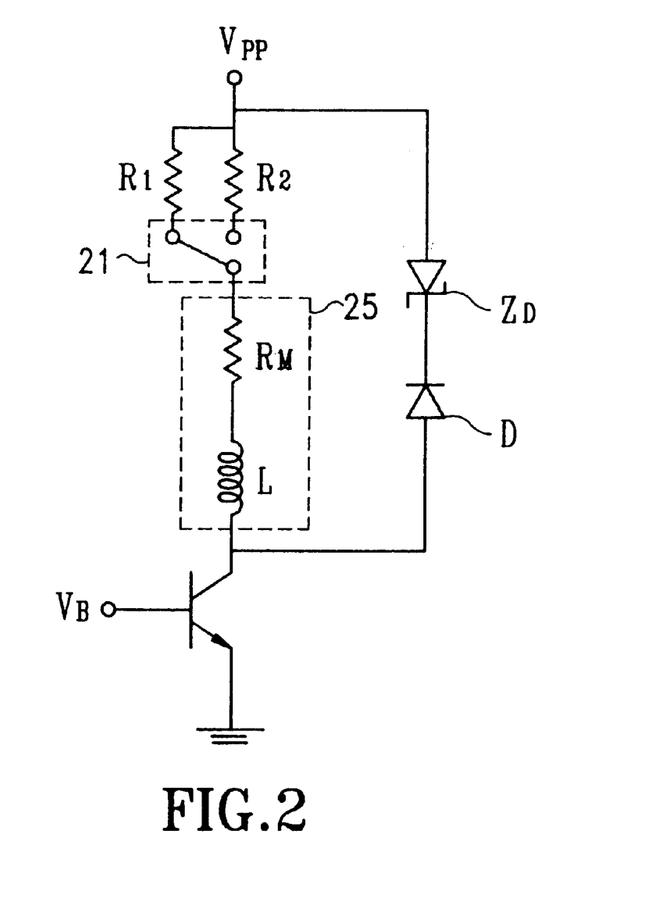
FIG. 2 is the circuit diagram of the stepping motor of the one preferred embodiment according to the present invention.
Figure 3:
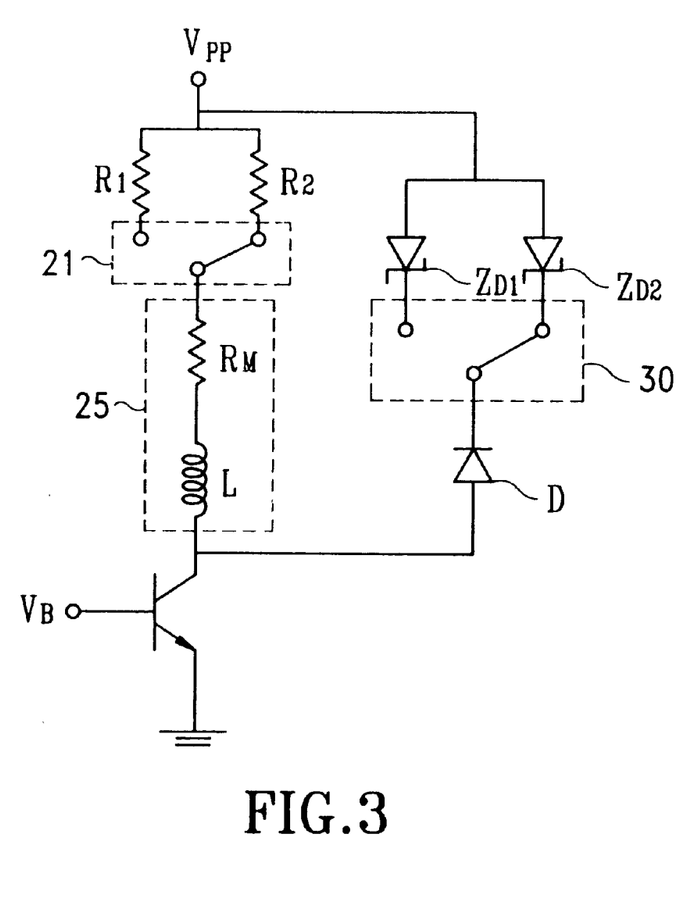
FIG. 3 is the circuit diagram of the stepping motor of the other preferred embodiment in the present invention.

Referring to FIG. 2, there are the first resistor $R_1$ and the second resistor $R_2$, and the switch 21 is used to connect either the first resistor $R_1$ or the second resistor $R_2$ to the stepping motor 25 according to the program designed by the designer. When different ranges of rotating speed of the stepping motor is needed, the program designed by the designer controls the switch 21 to connect the assigned resistor. Referring to FIG. 3, there are the first Zener diode $Z_{D1}$ and the second Zener diode $Z_{D2}$ and the switch 30 is used to connect either the first Zener diode $Z_{D1}$ or the second Zener diode $Z_{D2}$ to the diode D according to the program created by the designer. The switch 30 and the switch 21 is controlled by the program designed by the designer, and the stepping motor is connected to the assigned Zener diode and resistor by the controlled switch 30 and 21.

The first Zener diode $Z_{D1}$ and the second Zener diode $Z_{D2}$ are used to eliminate the back EMF (Electro-Mechanical Force) by releasing the charge stored in the first Zener diode $Z_{D1}$ and the second Zener diode $Z_{D2}$. The first Zener diode $Z_{D1}$ and the second Zener diode $Z_{D2}$ can be replaced by a charge-releasing device, so any kind of charge-releasing device that can be used to eliminate the charge stored in the stepping motor does not depart from the spirit of the present invention.

Figure 4:
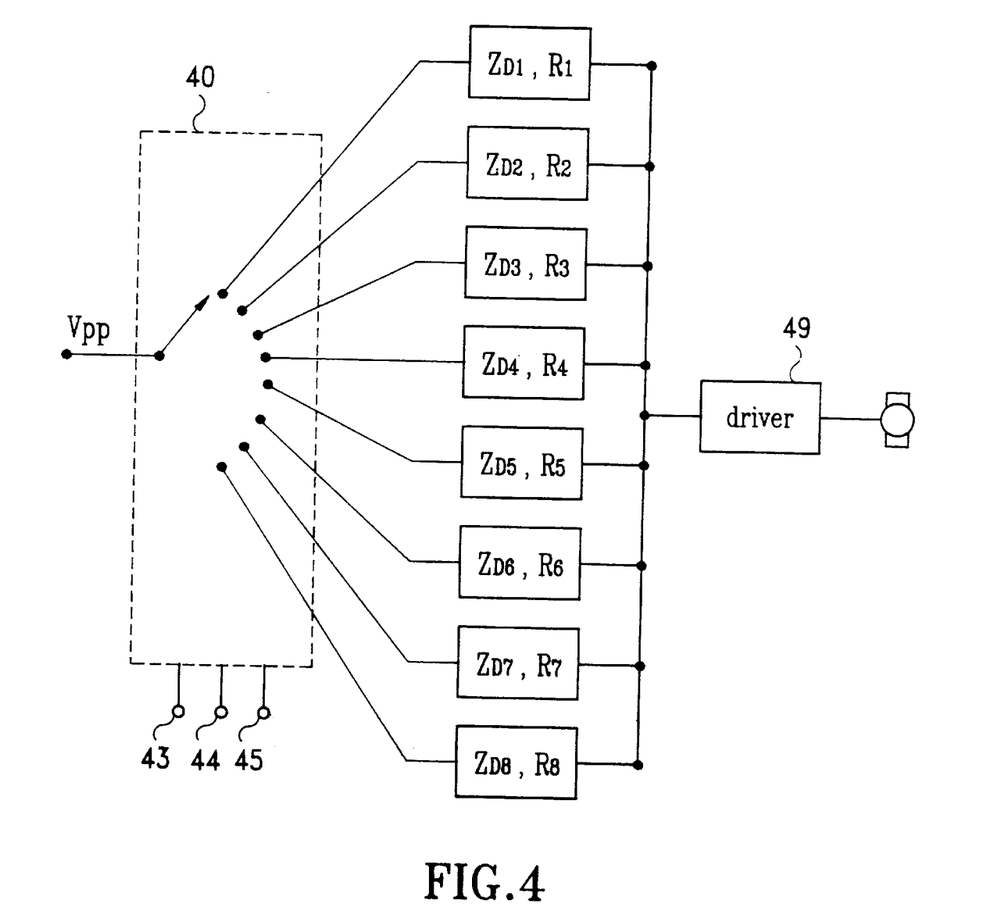
FIG. 4 is the general functional block diagram of the stepping motor of the image scanner according to the present invention.

The apparatus to implement the switch 21 and the switch 30 in the present invention can be implemented by a relay, a transistor or a multiplexer. The apparatus mentioned above is used for switching between several parameters. No matter which kind of switch is used, the variation of switch 21 and switch 30 can be made without departing from the spirit of the present invention. The general construction of the image scanner in functional block diagram is illustrated in FIG. 4. There are 8 parameters $(Z_{D1}, R_1), (Z_{D2}, R_2), (Z_{D3}, R_3), \ldots$ and $(Z_{D8}, R_8)$ controlled by the multiplexer 40, and the selection is carried out by the digits on the selection terminal 43, 44 and 45. The driver 49 provides the power that drives the stepping motor 50 to operate. In spite of the stepping motor only having a normal speed-torque characteristic, because the multiple parameters are utilized in the present invention, the global range of the scanning speed is available in the image scanner according to the present invention.

Although specific embodiments have been illustrated and described it will be obvious to those skilled in the art that various modifications may be made without departing from the spirit which is intended to be limited solely by the appended claims.

What is claimed is:

1. Apparatus for controlling the rotating speed of a electromechanical device, said apparatus comprising:

driving means for providing the power from a power source for the operation of said electromechanical device, said driving means is connected to said electromechanical device; and a plurality sets of electrical-parameter means for compensating the resistance of said electromechanical device and eliminating the back EMF (Electro-Mechanical Force) in said electromechanical device, every said plurality sets of electrical-parameter means being electrically coupled to said driving means, one of said plurality sets of electrical-parameter means being electrically coupled to said power source by a switch responding to a code according to a torque-speed mapping table, said torque-speed mapping table relates different ranges of rotating speed of said electromechanical device to said plurality sets of electrical-parameter means, the voltage across said selected electrical-parameter means and said driving means being suitable for eliminating the back EMF in said electromechanical device.

2. The apparatus as claim 1, wherein said electromechanical device is a stepping motor.

3. The apparatus as claim 1, wherein each of said plurality of sets of electrical-parameter means comprises a charge-releasing device and a resistor.

4. The apparatus as claim 3, wherein said charge-releasing device is a Zener diode.

5. Method for controlling the rotating velocity of a electromechanical device, said method comprising:

mapping a plurality sets of electrical-parameter means to different ranges of rotating speed of said electromechanical device to form a mapping table, each of said plurality sets of electrical-parameter means being selectively coupled to said electromechanical device, each of said plurality sets of electrical-parameter means relating to an electrical-parameter being used to eliminate the back EMF (Electro-Mechanical Force) in said electromechanical device within different ranges of rotating speed, each of said plurality of electrical-parameter means comprising a resistor and a charge-releasing device; and connecting a power source to a selected set of electrical-parameter means of said plurality sets of electrical-parameter means according to said mapping table, said driving means connected to said selected set of electrical-parameter means being used to provide the power that suitable is for the operation of said electromechanical device without the back EMF, said set of selected electrical-parameter means of said plurality sets of electrical-parameter means enabling said electromechanical device to rotate within a specified range of rotating speed without the back EMF.

6. Method for controlling the rotating speed of a stepping motor configured to carry a scanning head of a scanner, said method comprising:

mapping a plurality of sets of electrical-parameter means to different ranges of rotating speed of said stepping motor to form a mapping table, each of said plurality of sets of electrical-parameter means being selectively coupled to said stepping motor, when a specified resolution of said scanner relating to a specified range of rotating speed of said stepping motor being determined on an application interface, said application interface selects a set of electrical-parameter means of said plurality of sets of electrical-parameter means according to said mapping table, said plurality of sets of electrical-parameter means being used to eliminate the back EMF (Electro-Mechanical Force) in said stepping motor within different resolutions of said scanner; and connecting a power source to a selected set of electrical-parameter means of said plurality sets of electrical-parameter means according to said mapping table, said driving means connected to said selected set of electrical-parameter means being used to provide the power that is suitable for the operation of said stepping motor without the back EMF, said set of selected electrical-parameter means of said plurality sets of electrical-parameter means enabling said stepping motor to rotate within said specified range of rotating speed without the back EMF, said specified range of rotating speed enabling said scanner having said specified resolution.

7. A method of simultaneously controlling the speed and back EMF of a stepping motor in an image scanner, the stepping motor configured to move a scanning head of the image scanner at a plurality of stepping motor speeds, the method comprising:

creating a mapping table which maps a user-selected scanning resolution onto a corresponding one of a plurality of stepping motor speeds;

selecting a scanning resolution;

outputing a signal indicating a selected one of a plurality of sets of electrical parameter means which must be connected to the motor to produce a stepping motor speed corresponding to said selected scanning resolution;

activating at least one switch in response to said signal to thereby selectively connect a power source to said stepping motor via said selected set of electrical parameter means to both control the speed at which the stepping motor moves the scanning head in accordance with the selected scanning resolution, and also to mitigate the back EMF of said motor, said selected set of electrical parameter means comprising at least two electrical components.

8. The method of claim 7, comprising the step of applying the signal to a multiplexer configured to selectively connect said power source to said stepping motor via said selected electrical parameter means.

* * * * *